(12) United States Patent
Meis (10) Patent No.: US 10,669,035 B2
(45) Date of Patent: Jun. 2, 2020

(54) DETECTING THE PRESENCE OF ICE ON A SURFACE USING ULTRAVIOLET LIGHT

(71) Applicant: The Boeing Company, Chicago, IL (US)

(72) Inventor: Charles Steven Meis, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 112 days.

(21) Appl. No.: 15/910,799

(22) Filed: Mar. 2, 2018

(65) Prior Publication Data

US 2019/0270521 A1 Sep. 5, 2019

(51) Int. Cl.
| G06K 9/00 | (2006.01) |
| B64D 15/20 | (2006.01) |
| G06T 7/00 | (2017.01) |
| G06T 7/90 | (2017.01) |

(52) U.S. Cl.
CPC .............. *B64D 15/20* (2013.01); *G06T 7/001* (2013.01); *G06T 7/0008* (2013.01); *G06T 7/90* (2017.01); *G06T 7/97* (2017.01); *G06T 2207/10064* (2013.01)

(58) Field of Classification Search
CPC ........ B64D 15/20; B64D 43/00; B64D 45/00; B64D 2045/0085; G06T 7/97; G06T 7/90; G06T 7/0004; G06T 2207/10064; G06T 2207/30108; B64F 5/20; B64F 1/002; G01N 31/22; G08B 19/02; G06K 9/0063; G06K 9/2018; G06K 9/209; G06K 9/4661; G06K 9/0085; Y02A 90/19; G02B 5/208; H04N 5/232; F03D 80/40; B08G 5/0091

See application file for complete search history.

(56) References Cited

U.S. PATENT DOCUMENTS

| 2,371,259 A | * | 3/1945 | Patterson | ............... B64D 15/20 340/962 |
| 5,039,439 A |   | 8/1991 | Hansman, Jr. et al. | |
| 5,180,122 A | * | 1/1993 | Christian | .................. B64F 5/20 244/134 F |

(Continued)

OTHER PUBLICATIONS

Gerke, K. et al., "Criteria for selecting fluorescent dye tracers for soil hydrological applications using Uranine as an example", J. Hydrol. Hydromech., vol. 61, Issue 4, Dec. 1, 2013, pp. 313-325, XP055606219.

(Continued)

*Primary Examiner* — Jose L Couso
(74) *Attorney, Agent, or Firm* — Coats & Bennett, PLLC (57) ABSTRACT

A system detects ice on a surface. The system comprises an ultraviolet (UV) light source configured to project light primarily in the UV-A spectrum onto the surface. The system further comprises an optical device configured to capture an image of the surface while the light primarily in the UV-A spectrum is projected by the UV light source. The system further comprises a control device communicatively coupled to the optical device. The control device is configured to receive the image from the optical device and determine whether or not ice is present on the surface based respectively on whether or not visible light induced by the light projected by the UV light source is captured in the image.

26 Claims, 7 Drawing Sheets

(56) References Cited

U.S. PATENT DOCUMENTS

| | | | | |
|---|---|---|---|---|
| 5,557,261 A * | 9/1996 | Barbour | ............... | G01N 21/21 |
| | | | | 244/134 F |
| 5,921,501 A * | 7/1999 | Pernick | ................. | B64F 5/20 |
| | | | | 244/134 F |
| 6,425,286 B1 * | 7/2002 | Anderson | ............ | B64D 15/20 |
| | | | | 73/170.26 |
| 6,430,996 B1 * | 8/2002 | Anderson | ............ | B64D 15/20 |
| | | | | 73/170.26 |
| 6,606,035 B2 * | 8/2003 | Kapadia | ............... | B64F 1/002 |
| | | | | 340/933 |
| 9,483,951 B1 * | 11/2016 | McCusker | ........ | G08G 5/0091 |
| 2012/0207589 A1 | 8/2012 | Fridthjof | | |
| 2013/0113926 A1 * | 5/2013 | Chen | .................... | B64D 15/20 |
| | | | | 348/135 |
| 2017/0124402 A1 * | 5/2017 | Tanaka | ............... | H04N 5/2256 |
| 2018/0053063 A1 * | 2/2018 | Shemesh | ............... | G01W 1/08 |
| 2018/0079533 A1 * | 3/2018 | Suchezky | ............ | B64D 29/00 |
| 2018/0194487 A1 * | 7/2018 | Flynn | .................. | B64D 45/00 |
| 2018/0316859 A1 * | 11/2018 | Saenger Nayver | .... | H04N 5/332 |
| 2019/0077407 A1 * | 3/2019 | Miura | ................. | B60W 40/06 |
| 2019/0185186 A1 * | 6/2019 | Li | ........................ | G05D 1/101 |

OTHER PUBLICATIONS

Langford, V. et al., "Luminescent Photoproducts in UV-Irradiated Ice", Accounts of Chemical Research, vol. 33, No. 10, Oct. 1, 2000, pp. 665-671, American Chemical Society, XP055606050.
The Extended EP Search Report and Written Opinion for EP 19158333.5 dated Jul. 26, 2019, pp. 1-10.

* cited by examiner

DETECTING THE PRESENCE OF ICE ON A SURFACE USING ULTRAVIOLET LIGHT

BACKGROUND

Throughout aviation history the accumulation of ice on the critical surfaces of aircraft wings has presented an issue. Indeed, a small amount of ice accumulation on the leading edge of an aircraft wing can impact the lift and drag characteristics of a surface. Accordingly, the detection of aircraft icing is common procedure, which is generally required to comply with Federal Aviation Administration (FAA) regulations, such as those within the supercooled liquid water envelopes defined by 14 C.F.R. Part 25, Appendix C and Appendix O.

Visual identification of icing conditions by the flight crew is sometimes possible, but is typically quite difficult to do while flying at night, when it is dark outside the aircraft, or when visibility is otherwise poor. Although various systems and technologies exist for ice detection on aircraft, the limitations of such systems and technologies often allow ice to form on the leading edge of a wing in the temperature region just below freezing. Because such ice is able to form prior to detection by certain types of ice detection sensors, this temperature region is sometimes referred to as a zone of non-detection.

Some aircraft, such as the Boeing 737, do not typically have an ice detection system but rely solely on the flight crew and visual means for detection of icing conditions. FAA regulation 14 C.F.R. § 25.1403 specifies a means of determining the presence of ice accretion on aircraft wings during night operations. A typical means for meeting this requirement uses flush-mounted lights installed on the fuselage which are pointed in the direction of the wing leading edge. These lights may use an incandescent or light-emitting diode (LED), visible light source and are intended to project enough light onto the leading edge of the wing to be a visual aid for the flight crew to see the wings. Although these lights improve the ability to see the wings, it is nonetheless often difficult or impractical for the flight crew to detect ice in a timely manner for the activation of aircraft ice protection systems, particularly since ice and the wing surface are often difficult to visually differentiate, e.g., from a distance and/or when the wing is wet.

SUMMARY

Various aspects of the present disclosure generally relate to methods, devices, systems, computer readable media, computer program products, carriers, signals, hardware and/or software that detects icing on a surface of a vehicle. Particular aspects address a need for a system that provides or enables positive identification of ice, differentiation between an iced surface and a wet or dry surface, and/or automation of the ice detection process. Particular aspects herein use ultraviolet wing illumination lights to identify and/or detect ice accretion on aircraft wings so that flight crew may be notified accordingly. Further aspects automatically activate the aircraft ice protection systems, e.g., as an aid to flight crew while in flight.

Further, at least some aspects include the use an ultraviolet light source in the UV-A wavelength range of 315 to 400 nanometers (nm) (sometimes known as a UV-A or black light) in the detection of icing on a surface of an aircraft. According to particular aspects, this detection is performed in real time on aircraft (e.g., transport-category commercial aircraft), and supports temperatures and conditions within the FAA icing regulations, e.g., 14 C.F.R. Part 25, Appendix C and Appendix O icing envelopes.

Particular aspects of the present disclosure include a system for detecting ice on a surface. The system comprises an ultraviolet (UV) light source configured to project light primarily in the UV-A spectrum onto the surface, an optical device configured to capture an image of the surface while the light primarily in the UV-A spectrum is projected by the UV light source, and a control device communicatively coupled to the optical device. The control device is configured to receive the image from the optical device and determine whether or not ice is present on the surface based respectively on whether or not visible light induced by the light projected by the UV light source is captured in the image.

In some aspects, the control device is further configured to signal an ice protection system communicatively coupled to the control device to device the surface responsive to the control device detecting that the ice is present.

In some aspects, to determine whether or not ice is present on the surface based respectively on whether or not visible light induced by the light projected by the UV light source is captured in the image, the control device is configured to detect whether or not luminescence is captured in the image.

In some aspects, the UV light source and optical device are mounted on a fuselage of an aircraft and the surface is a surface of an airfoil. In some such aspects the surface is aft of the UV light source and optical device on the fuselage.

In some aspects, to determine whether or not ice is present on the surface based respectively on whether or not visible light induced by the light projected by the UV light source is captured in the image, the control device is configured to compare the image to a baseline image of the surface in which ice is not present. In some such aspects, to compare the image to the baseline image in which ice is not present on the surface, the control device is configured to compare color characteristics of the image to color characteristics of the baseline image.

In some aspects, to determine whether or not ice is present on the surface based respectively on whether or not visible light induced by the light projected by the UV light source is captured in the image, the control device is configured to determine which of a plurality of stored images most closely resembles the image received from the optical device. In some such aspects, the plurality of stored images comprises different images of the surface in which ice is present at different temperatures.

In some aspects, the system further comprises an aircraft on which the UV light source and optical device are mounted, and which comprises the control device.

Other aspects of the present disclosure include an aircraft. The aircraft comprises an ultraviolet (UV) light source configured to project light primarily in the UV-A spectrum onto a surface of the aircraft, an optical device configured to capture an image of the surface while the light primarily in the UV-A spectrum is projected by the UV light source, and a control device communicatively coupled to the optical device. The control device is configured to receive the image from the optical device and determine whether or not ice is present on the surface based respectively on whether or not visible light induced by the light projected by the UV light source is captured in the image.

In some aspects, the control device is further configured to signal an ice protection system communicatively coupled to the control device to device the surface responsive to the control device determining that the ice is present.

In some aspects, to determine whether or not ice is present on the surface based respectively on whether or not visible light induced by the light projected by the UV light source is captured in the image, the control device is configured to detect whether or not luminescence is captured in the image.

In some aspects, to determine whether or not ice is present on the surface based respectively on whether or not visible light induced by the light projected by the UV light source is captured in the image, the control device is configured to compare the image to a baseline image of the surface in which ice is not present. In some such aspects, to compare the image to the baseline image in which ice is not present on the surface, the control device is configured to compare color characteristics of the image to color characteristics of the baseline image.

In some aspects, to determine whether or not ice is present on the surface based respectively on whether or not visible light induced by the light projected by the UV light source is captured in the image, the control device is configured to determine which of a plurality of stored images most closely resembles the image received from the optical device. In some such aspects, the plurality of stored images comprises different images of the surface in which ice is present at different temperatures.

Other aspects of the present disclosure include a method, implemented by an ice detection system, of detecting ice on a surface. The method comprises receiving an image of the surface while a light, primarily in the ultraviolet (UV)-A spectrum, is projected onto the surface by a UV light source, and determining whether or not ice is present on the surface based respectively on whether or not visible light induced by the light projected by the UV light source is captured in the image.

In some aspects, the method further comprises projecting, by the UV light source, the light primarily in the UV-A spectrum onto the surface.

In some aspects, receiving the image comprises capturing, by an optical device of the ice detection system, the image of the surface while the light primarily in the UV-A spectrum is projected by the UV light source.

In some aspects, the method further comprises signaling an ice protection system to device the surface responsive to detecting that the ice is present.

In some aspects, determining whether or not ice is present on the surface based respectively on whether or not visible light induced by the light projected by the UV light source is captured in the image comprises detecting whether or not luminescence is captured in the image.

In some aspects, determining whether or not ice is present on the surface based respectively on whether or not visible light induced by the light projected by the UV light source is captured in the image comprises comparing the image to a baseline image of the surface in which ice is not present. In some such aspects, comparing the image to the baseline image in which ice is not present on the surface comprises comparing color characteristics of the image to color characteristics of the baseline image.

In some aspects, determining whether or not ice is present on the surface based respectively on whether or not visible light induced by the light projected by the UV light source is captured in the image comprises determining which of a plurality of stored images most closely resembles the image. In some such aspects, the plurality of stored images comprises different images of the surface in which ice is present at different temperatures.

Other aspects include one or more devices, computer program products, configured non-transitory computer-readable mediums, carriers, systems, hardware, software, and/or any combination thereof that are configured to perform any of the methods described herein.

DETAILED DESCRIPTION

Figure 1:
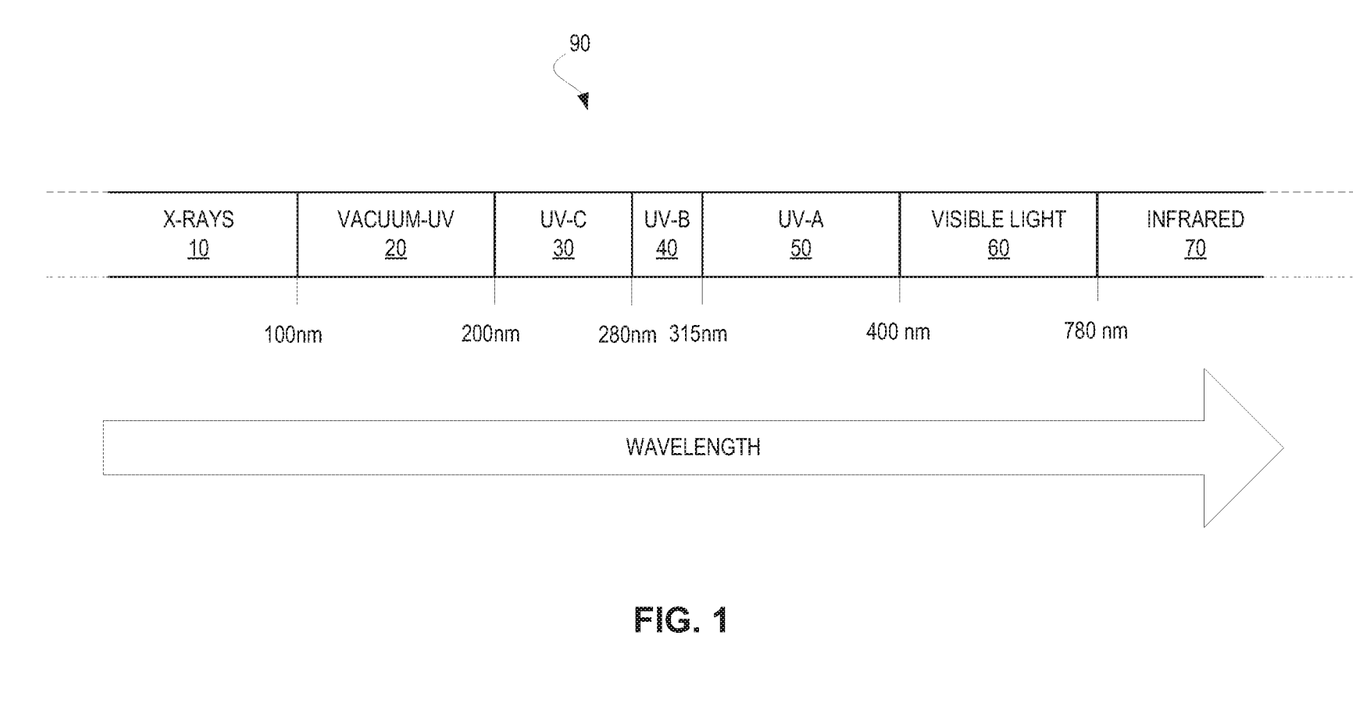
FIG. 1 is a block diagram illustrating an example of the electromagnetic spectrum.

An example portion of the electromagnetic spectrum 90 is shown in FIG. 1. The electromagnetic spectrum 90 includes wavelengths in the x-ray spectrum 10, the vacuum-ultraviolet (UV) spectrum 20, the UV-C spectrum 30, the UV-B spectrum 40, the UV-A spectrum 50, the visible light spectrum 60, and the infrared spectrum 70, in order of increasing wavelengths. The UV-A spectrum 50 in particular is adjacent to, and includes wavelengths shorter than, the visible light spectrum 60. Although many black lights produce light throughout the UV range 20, 30, 40, 50, their light is mostly confined to the UV-A spectrum 50. That is, the principal wavelength of a black light is within the UV-A range of 315 to 400 nm.

Although UV radiation is invisible to the human eye, illuminating certain materials with UV radiation causes the emission of light in the visible light spectrum 60, which the human eye perceives as a glow of any of a variety of colors. This glow may be the result of a number of factors, broadly characterized as luminescence, which is the emission of light by a substance not resulting from heat, i.e., a form of cold-body radiation. One type of luminescence is fluorescence, which occurs when light is absorbed and reemitted by a substance, often at a longer wavelength. Another type of luminescence is phosphorescence, which is similar to fluorescence except that the absorbed light energy is stored for a longer period of time before reemission. Yet another type of luminescence is chemiluminescence, which is a process that produces light by virtue of a chemical reaction. Other types of luminescence exist by virtue of other conditions.

Although other types of light sources emit light in the visible light spectrum 60 (which drowns out the glow), black lights are particularly useful for observing luminescence. Aspects of the present disclosure use one or more black lights to make formation or accretion of ice on an airfoil or other surface more visible to the human eye and/or detectable by one or more sensors. Because such formation or accretion of ice is a solid, typically white state of water, the glow caused by the use of a black light will differ from that of liquid water and most dry, non-iced surfaces. This glow may be due to one or more forms of luminescence of the ice itself and/or an impurity therein. Other aspects include observing a change in color and/or contrast of the surface not caused by luminescence.

Figure 2:
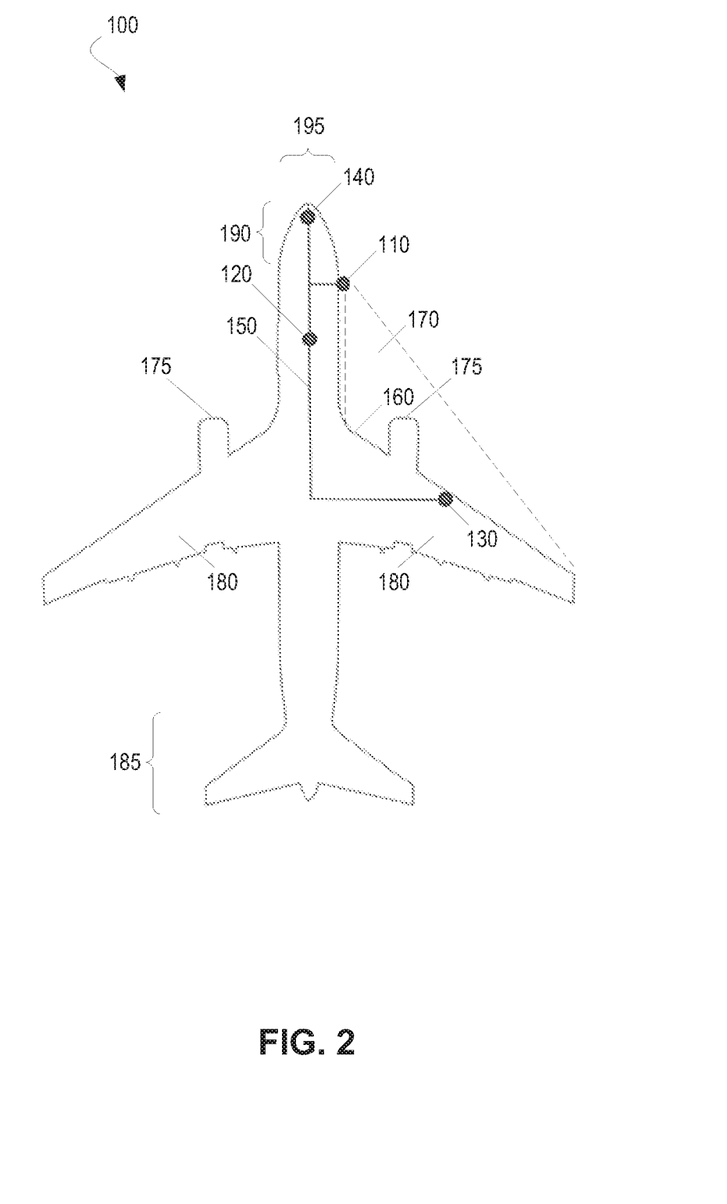
FIG. 2 is a diagram of an example aircraft, according to one or more aspects of the present disclosure.

FIG. 2 illustrates an example aircraft 100 according to aspects of the present disclosure. The aircraft 100 comprises a fuselage 195 that forms the main body of the aircraft 100, with a flight deck 190 at the nose and an empennage 185 at the aft. The aircraft 100 further comprises wings 180 mounted on opposing lateral sides of the fuselage 195. The aircraft 100 further comprises an engine nacelle 175 mounted under each wing 180. Although the aircraft 100 in the example of FIG. 2 includes an engine nacelle 175 mounted under each wing 180, other aircraft 100 consistent with aspects of the present disclosure may have no engine nacelles 175 (e.g., as in a glider), a single engine nacelle 175, or additional engine nacelles 175. Further, such other aircraft 100 having one or more engine nacelles 175 may have the engine nacelle(s) mounted at other locations on the aircraft 100, e.g., such as over the wing 180 or on the fuselage 195, among other positions.

The aircraft 100 further includes an image capturing system 110 mounted on the fuselage 195. The image capturing system 110 comprises a light source that casts a beam 170 of light onto a surface 160 of the aircraft 100. In this example, the surface 160 is the leading edge of a wing 180. As will be discussed in greater detail below, in some aspects, the image capturing system 110 further comprises an optical device, light source, and/or a control device.

According to aspects of the present disclosure, the light source is a UV-A light source such that the principal wavelength of the beam 170 is in the UV-A spectrum 50. In some aspects, the light source is a high-intensity flashlight, lamp, laser pointer, or similar light producing device. In some such aspects, the light source is collocated with wing illumination lights of the aircraft (not shown).

The aircraft further comprises a control device 120, an ice protection system 130, and a display 140 that are communicatively coupled to each other and the image capturing system 110 by a communication bus 150. The display, according to this example, is located in the flight deck 190. The ice protection system 130, according to this example, is installed in the wing 180 comprising the surface 160. In some aspects, the ice protection system 130 is symmetric on the aircraft 100, such that each of the wings 180 is protected from ice.

The beam 170 induces visible light from ice formed on the surface 160, if present, to be returned in a manner that is more readily captured by the image capturing system 110 and/or the human eye, thereby enabling the detection of ice more quickly and/or more reliably than other, more traditional approaches (e.g., by detecting ice at temperatures just below freezing and/or by more readily distinguishing ice from liquid water and/or a dry surface). Once detected, the ice protection system 130 is activated, e.g., earlier and/or more reliably than systems relying on light in the visible light spectrum 60.

Although FIG. 2, for purposes of clearly illustrating aspects of the present disclosure, illustrates a single image capturing system 110 that produces a single beam 170 onto a single surface 160 of a wing that is protected by an ice protection system 130, the aircraft 100 may include one or more additional or alternative arrangements anywhere on the aircraft 100 to monitor a surface of interest, e.g., on the other lateral side of the aircraft to monitor the opposing wing 180. Indeed, an actual installation would most likely include symmetric left and right-hand systems, both for redundancy and to account for ice accretion uniquely forming on one side or the other due to flight conditions inducing sideslip, etc. Since the UV-A/black light ice detection system may have redundant features on both sides of the airplane, a further advantage allows for one sensor, monitor, or controller detecting ice to activate ice protection systems for both wings (which may be advantageous and/or an aerodynamic requirement).

Further, although the use of one or more UV-A/black lights is shown in FIG. 2 as installed at a location that would also be appropriate for wing illumination lighting, other aspects included herein are not limited to the use of UV-A/black lights (i.e., in the wavelength range of 315 to 400 nm), nor are they limited to installation at a typical wing illumination light mounting point of an aircraft 100. Indeed, other aspects may be suitable for installation on a variety of vehicles, mounted at a variety of locations, and/or configured to cast light on one or more of a variety of surfaces on which the detection of ice formation is desired.

For example, some aspects include ice detection on other aircraft surfaces such as the inlet of an engine nacelle 175, the empennage 185, and/or other surfaces. Aspects also include vehicles other than an aircraft 100, such as a spacecraft, rotorcraft, satellite, rocket, terrestrial vehicle, surface water borne vehicle, sub-surface water borne vehicle, subterranean vehicle, or any combination thereof. In some aspects, the vehicle is suitable for commercial, transport, and/or industrial purposes. Further, at least some of the aspects include a structure, such as a building designed to house, store, and/or dock one or more such vehicles. In some aspects, the structure is a residential, commercial, and/or industrial building.

According to embodiments, the surface 160 is monitored and/or recorded by the image capturing system 110, and the resulting images are transmitted (e.g., in real time) to the control device 120, e.g., via the communication bus 150. According to aspects, the communication bus 150 is a physical medium configured to carry optical and/or electrical signals. According to other aspects, an air interface configured to carry radio signaling is alternatively used for communication between one or more components.

FIG. 2 illustrates the image capturing system 110 and control device 120 as separate modules or units. For example, the image capturing system 110 may be mounted at or near wing illumination lighting on a side of the fuselage 195, whereas the control device 120 may be mounted in an electronics bay within the fuselage 195 or flight deck 190. Alternatively, the control device 120 may be comprised in the image capturing system 110, in some aspects.

Aspects of the present disclosure enable mitigation of the effects of ice accretion by alerting a flight crew or other personnel to the presence of icing conditions, and/or by transmitting signals to activate the ice protection system 130 associated with the surface 160.

Although the ice detection system described herein may be active, e.g., any time vehicle power is available (e.g., regardless of whether day or night operations are being conducted), the UV-A/black light is particularly beneficial during night operations (i.e., when it is generally more difficult to detect ice forming on certain surfaces, like the leading edge of a wing 180, using the naked eye.

Figure 3:
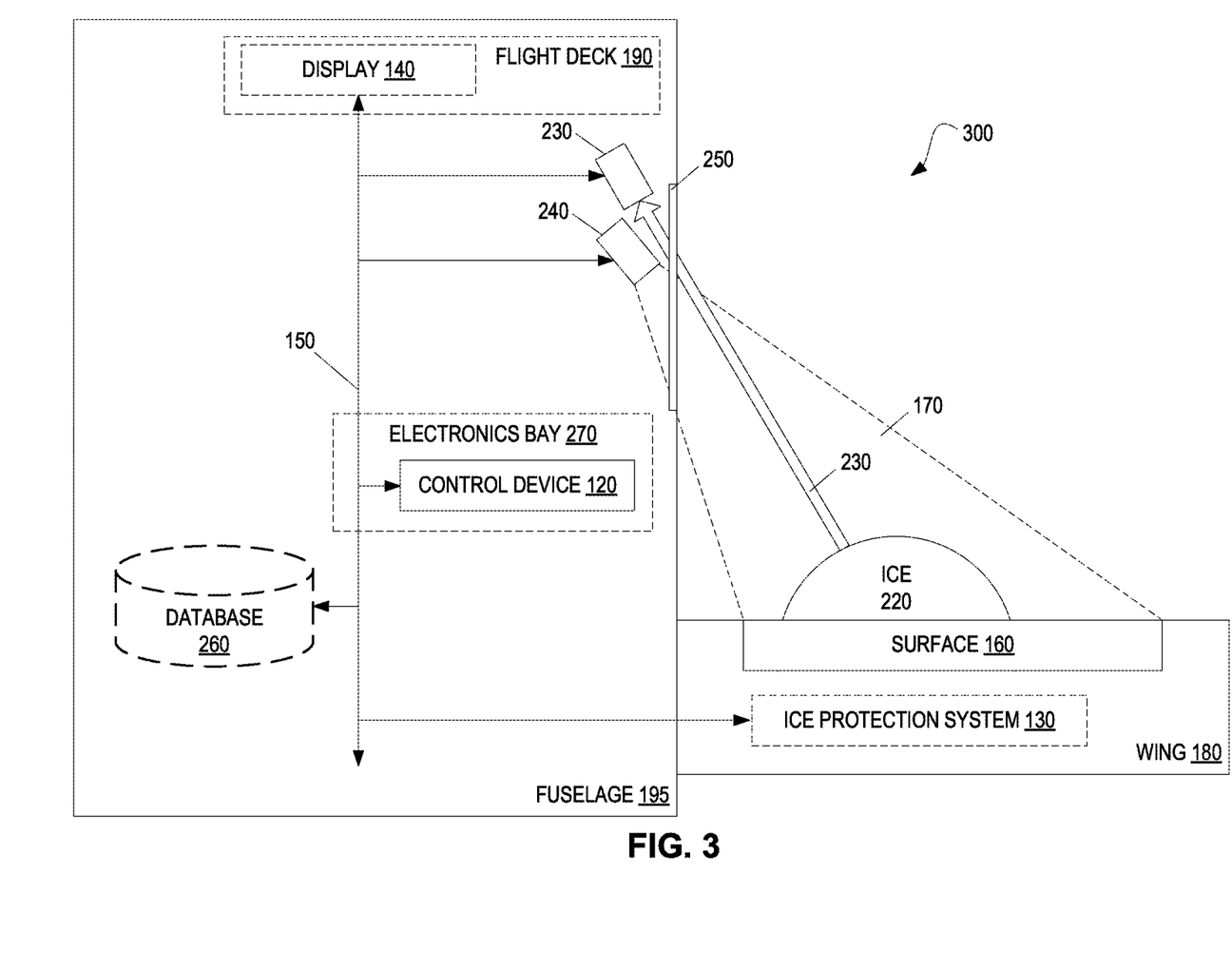
FIG. 3 is a block diagram illustrating an ice detection system, according to one or more aspects of the present disclosure.

FIG. 3 is a block diagram schematically depicting operation of a system 300 in accordance with particular aspects of the present disclosure appropriate for use in an aircraft 100. As shown in FIG. 3, a light source 240, optical device 230, display 140, and control device 120 are comprised in the fuselage 195 and are communicatively coupled to each other by a communication bus 150. A display 140, also connected to the communication bus 150 is comprised in the flight deck 190. A wing 180 comprises an ice protection system 130 which is also connected to the communication bus 150. The wing 180 also comprises a surface 160 on its leading edge, which is aft of the light source 240 and the optical device 230. In this example, ice 220 has formed on the surface 160.

The light source 240 projects a beam 170 of UV-A light through a transparent surface 250 of the fuselage 195, and aftward toward the surface 160. The beam 170 causes visible light to be returned from any ice 220 formed on the surface 160, such that light 230 is carried back through the transparent surface 250 and towards the optical device 230. The optical device 230 captures images (e.g., photos, video) of the surface 160 and the light 230 from the ice 220.

The light source 240 is a UV-A/black light. Such a light source 240 may be a commercially available UV-A/black light with a wavelength of 395 nm, for example. In some aspects, the light source 240 additionally or alternatively comprises several individual LEDs to produce the beam 170. The LEDs may, in some aspects, be combined in a one-inch cylindrical housing. In some aspects, the light source 240 is flush-mounted or slightly behind the transparent surface 250, which in some aspects is a flush camera lens. In some aspects, the beam 170 is aimed at the surface 160 (e.g., a target airfoil surface) from a distance of between 10 to 15 feet, for example. In some aspects, the beam 170 produced by the light source 240 is produced at an intensity of 100 lumens (e.g., or within 10 lumens thereof). Accordingly, the beam 170 is sufficiently intense given the distance between the light source 240 and the surface 160 to illuminate the surface such that accretion of the ice 220 is discernable from images captured by the optical device 230.

In some aspects, the transparent surface 250 is a heated lens. In some such aspects, the lens is heated electronically. Other aspects heat the lens by other means. According to other aspects, the optical device 230 and transparent surface 250 are comprised in a digital camera. Additionally or alternatively, the optical device 230 and light source 240 are elements comprised in an image capturing system 110, as described above (not shown).

In some aspects, the optical device 230 is a digital camera installed flush on an inside surface of the fuselage 195 just forward of the light source 240. In some aspects, the camera lens is flush with the fuselage 195 and the camera is installed at an angle so that the camera faces through the lens at the surface 160. The lens may be electrically heated (e.g., supplied by the same aircraft power source as the UV-A/black light source 240) to prevent the formation of ice or fog on the lens itself that could interfere with the camera view. The camera may be focused on the wing leading edge (or other surface of interest) and may provide continuous video or regularly updated still photographic data to control device 120, so that image data may be distinguished from baseline visual characteristics of the surface 160 to determine when color characteristics and/or luminescence changes based on accretion of ice 220 on the surface 160. Accordingly, the system 300 distinguishes between ice 220 and a dry or liquid surface. Thus, in some aspects, the identification of ice 220 is performed by a comparison of the live photographic images against a database 260, which may be comprised in embedded software of the controller 120.

One or more of the images captured by the optical device may be used in a variety of ways, according to different aspects. In one aspect, an image is output from the optical device 230 to the display 140 in the flight deck 190, e.g., to enable a crew of the aircraft 100 to determine whether icing is present. In another aspect, an image is additionally or alternatively sent from the optical device 230 to the control device 120, which is configured (e.g., by software) to determine whether icing is present. In response to detecting that icing is present, the control device 120 is configured to transmit a signal to the flight crew. In another aspect, the control device 120 is additionally or alternatively configured to activate the ice protection system 130 (e.g., automatically).

In one particular example consistent with aspects described above, live video or regularly updated still camera images that have been captured by the optical device 230 are sent to the display 140 in the flight deck 190 (e.g., in some aspects via the control device 120) so the flight crew can see the surface 160 of the wing 180 and make a decision in accordance with 14 C.F.R. § 25.1403 relating to illumination and visual ice detection. In another particular example, the control device 120 is configured to compare image data captured by the optical device 230 to information comprised in a database 260 to determine whether ice accretion is present, and send an advisory icing signal to alert the flight crew based thereon.

In some aspects, the database 260 is accessed by the control device 120 via the communication bus 150, as shown in FIG. 3. In other aspects, the database 260 is an internal database of the control device 120. In some aspects, the control device 120 additionally or alternatively transmits a signal to activate the ice protection control system 130. Such a signal may be transmitted directly to the ice protection control system 130, or to a separate controller that controls the ice protection control system 130 (not shown), which may be located in the wing 180 or the electronics bay 270, for example. In other aspects, video or regularly updated still photographic images captured by the optical device 230 are sent to the display 140 where they are made visible to, e.g., the pilot(s) to advise him/her/them of icing conditions, and the pilot(s) would be responsible for activating the ice protection system 130 manually.

According to various aspects, the image data captured by the optical device 230 are analyzed by a control device 120 that is either a dedicated or a federated airplane controller, compared to a database 260 of ice accretion, and a resulting real-time indication of icing conditions is be transmitted to the flight deck 190 (e.g., to the display 140) to alert the crew of the need to activate the ice protection system 130. Alternatively, the control device 120 automatically activates the ice protection system 130 to act upon the surface 160.

Further, as mentioned above, the control device 120 is, in some aspects, an integral part of the image capturing system 110. Alternatively, the control device 120 may be housed in a federated controller located elsewhere in the aircraft 100, such as in an electronics bay 270. In some aspects, the control device 120 monitors and/or transmits images of the surface 160 that would indicate when ice 220 is present thereon. Images may be transmitted in real-time to the display 140 in the flight deck 190 for crew awareness and action, for example. Alternatively, software of the control device 120 may perform logical operations and comparisons of the images to a database 260, and make determinations as to whether ice 220 is present on the surface, and transmit digital signals to the crew, to activate the ice protection system 130, or to another federated ice protection system controller (not shown) which would automatically activate the ice protection system 130. In at least some aspects, the signals are transmitted through the communication bus 150, which may be a physical electrical or optical medium for carrying digital or analog signaling, or an air interface for carrying wireless signals. Any or all of the elements in the system 300 may be powered by an appropriate power source or combination of power sources (not shown), such as (for example), one or more batteries and/or one or more pneumatic pressure/vacuum sources.

Figure 4:
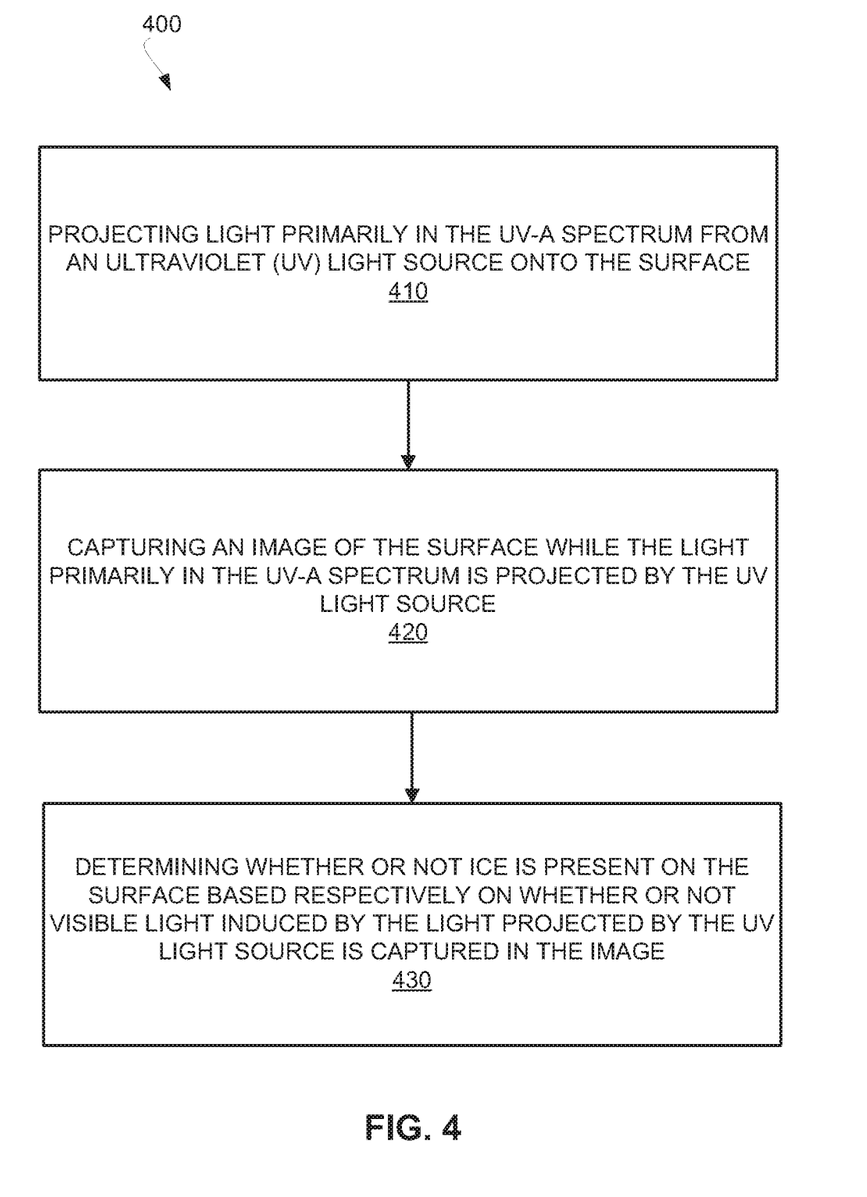
FIG. 4 is a flow diagram illustrating an example method, according to one or more aspects of the present disclosure.

Consistent with aspects described above, FIG. 4 illustrates an example method 400 of detecting ice 220 on a surface 160. The method 400 is implemented by an ice detection system 300. The method 400 comprises projecting light primarily in the UV-A spectrum 50 from an ultraviolet (UV) light source 240 onto the surface 160 (block 410), and capturing an image of the surface 160 while the light primarily in the UV-A spectrum 50 is projected by the UV light source 240 (block 420). The method 400 further comprises determining whether or not ice 220 is present on the surface 160 based respectively on whether or not visible light induced by the light projected by the UV light source 240 is captured in the image (block 430).

Figure 5:
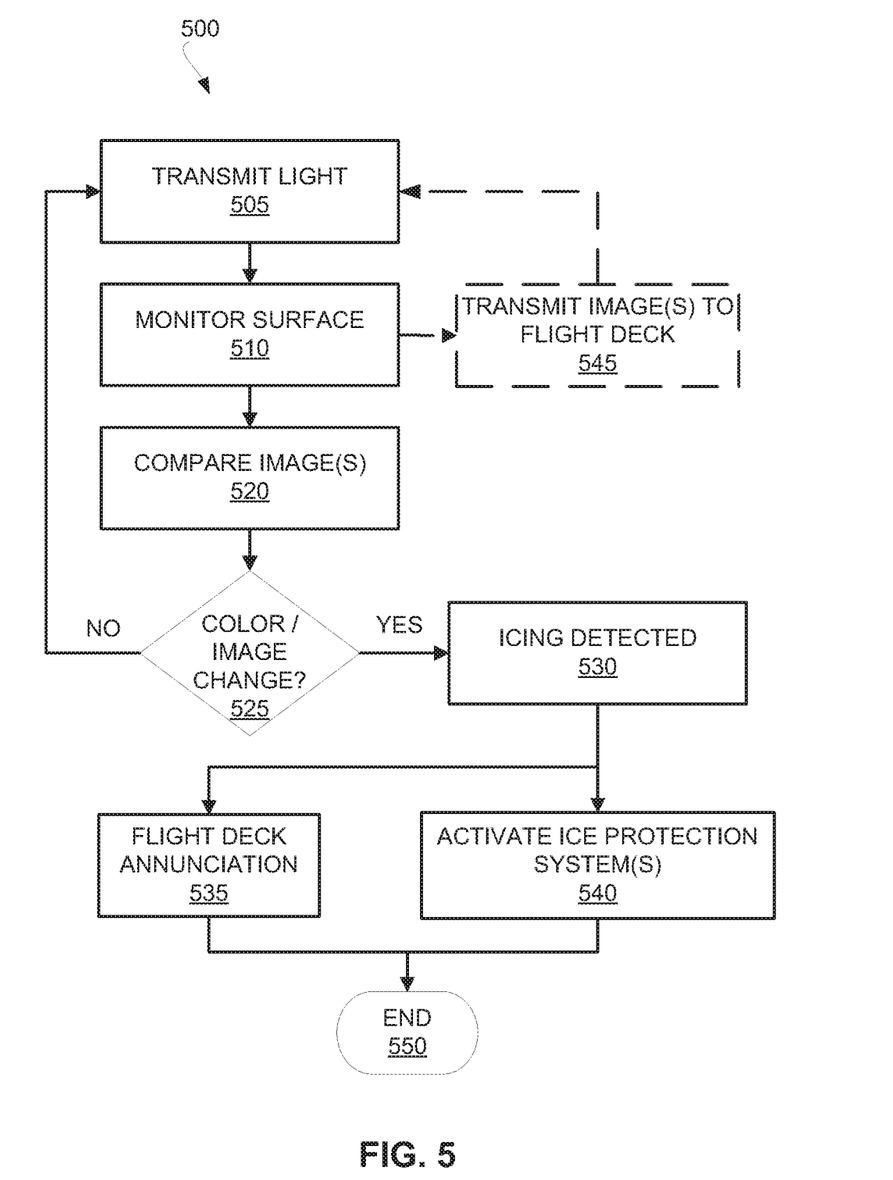
FIG. 5 is a flow diagram illustrating a more detailed example method, according to one or more aspects of the present disclosure.

FIG. 5 illustrates a more detailed method 500 of detecting ice 220 on a surface 160. According to this more detailed method 500, initial operation of the system 300 begins when the aircraft 100 is powered up. The UV-A/black light source 240 (e.g., as part of a larger wing illumination system) is activated to transmit light (block 505) while aircraft power is available and the optical device 230 (e.g., digital camera) visually monitors the wing leading edge surface 160 in real time for indication of an optical change of the surface 160 (block 510). Photographic data could be comprised of, e.g., continual video images and/or still photos taken at a constant rate of, for example, one photo per second. In some aspects, the image(s) captured are transmitted to the flight deck 190 for observation by the flight crew (block 545).

The captured image(s) are compared to a database 260 of example images stored within software of the control device 120 (block 520). If the control device 120 determines that no significant color and/or image changes are observed (block 525, no), the method 500 restarts. When the control device 120 determines that an optical change has occurred (block 525, yes), a positive identification of icing conditions is indicated (block 530). Detection signals are transmitted, e.g., via the communication bus 150, to the flight deck 190 to alert the pilots (block 535) and/or to a federated controller of an ice protection system 130 (e.g., in the electronics bay 270) to initiate automatic activation of the appropriate ice protection systems (block 540). The method 500 then ends (block 550).

Although aspects of the present disclosure may be implemented in similar fashion to a wing illumination system architecture, the ice detection system 300 is able to detect optical changes in a surface 160 of interest through use of a UV-A/black light source 240, which may be particularly advantageous, e.g., for detecting icing conditions during night operations at any temperature within the 14 CFR 25, Appendix C and Appendix O icing envelopes, thereby meeting the requirements of 14 CFR 25.1403 in addition to any zone of non-detection temperature effects. Such a system 300 may be useful, e.g., to future and/or existing commercial transport-category airplanes, including (but not limited to) aircraft 100 similar to the Boeing 737 that do not have an ice detection system and rely solely on the flight crew and visual means for detection of icing conditions. In some aspects, the system 300 is more accurate by eliminating the potential zones of non-detection that exist in existing ice detection designs or technologies. In some aspects, the system 300 improves important aircraft characteristics such as performance, safety, and/or fuel efficiency by providing the capability for automatic activation of one or more ice protection systems 130. The system 300 may be used in a variety of public and private transportation solutions, such as automobiles, trains, buses, etc. In these cases, ice detection may be intended to provide an indication to drivers of inclement or severe weather conditions.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein.

Figure 6:
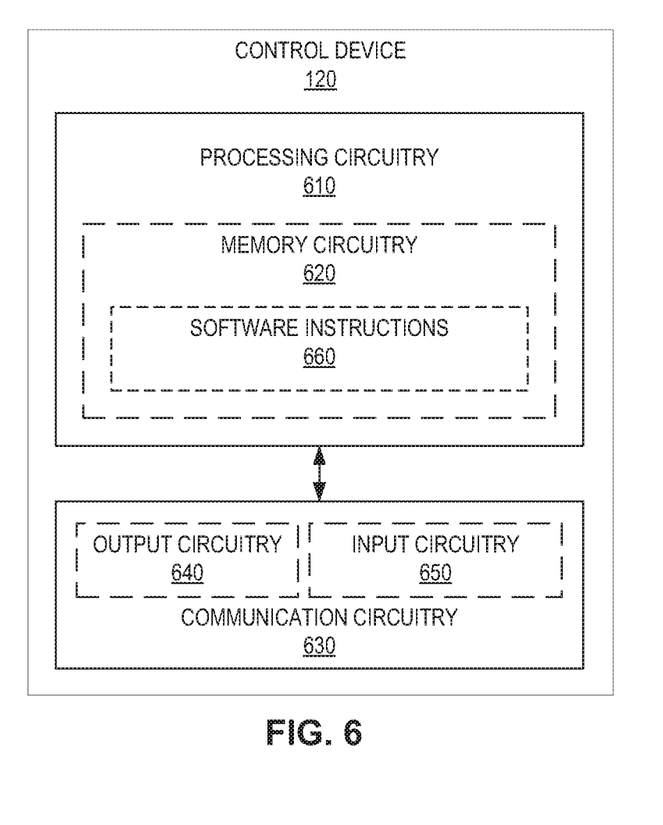
FIG. 6 is a block diagram illustrating an example control device, according to one or more aspects of the present disclosure.

For example, FIG. 6 illustrates an example of the control device 120, according to particular aspects of the present disclosure. According to this example, the control device 120 comprises processing circuitry 610 and communication circuitry 630. The processing circuitry 610 is communicatively coupled to the communication circuitry 630, e.g., via one or more buses. The processing circuitry 610 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 610 may be programmable hardware capable of executing software instructions 660 stored, e.g., as a machine-readable computer program in memory circuitry 620 of the processing circuitry 610. The memory circuitry 620, according to various aspects, may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The communication circuitry 630 may be a controller hub configured to control the input and output (I/O) data paths of the control device 120. Such I/O data paths may include data paths for exchanging signals over a communication bus 150 and/or air interface. For example, the communication circuitry 630 may comprise a transceiver configured to send and receive communication signals over one or more of a cellular network, Ethernet network, or optical network.

The communication circuitry 630 may be implemented as a unitary physical component, or as a plurality of physical components that are contiguously or separately arranged, any of which may be communicatively coupled to any other, or may communicate with any other via the processing circuitry 610. For example, the communication circuitry 630 may comprise output circuitry 640 (e.g., transmitter circuitry configured to send communication signals over the communication bus 150) and input circuitry 650 (e.g., receiver circuitry configured to receive communication signals over the communication bus 150). Other examples, permutations, and arrangements of the above and their equivalents will be readily apparent to those of ordinary skill.

According to embodiments of the control device 120 illustrated in FIG. 6, the processing circuitry 630 is configured to receive an image from an optical device, via the communication circuitry 630, and determine whether or not ice is present on a surface 160 based respectively on whether or not visible light induced by light projected by a UV light source 240 is captured in the image. In some aspects, the processing circuitry 630 is further configured to signal an ice protection system 130 communicatively coupled to the control device 120 to device the surface 160 responsive to the control device 120 detecting that the ice is present. In some aspects, the processing circuitry 630 is additionally or alternatively configured to signal a display 140 to annunciate the icing condition to a human operator.

Figure 7:
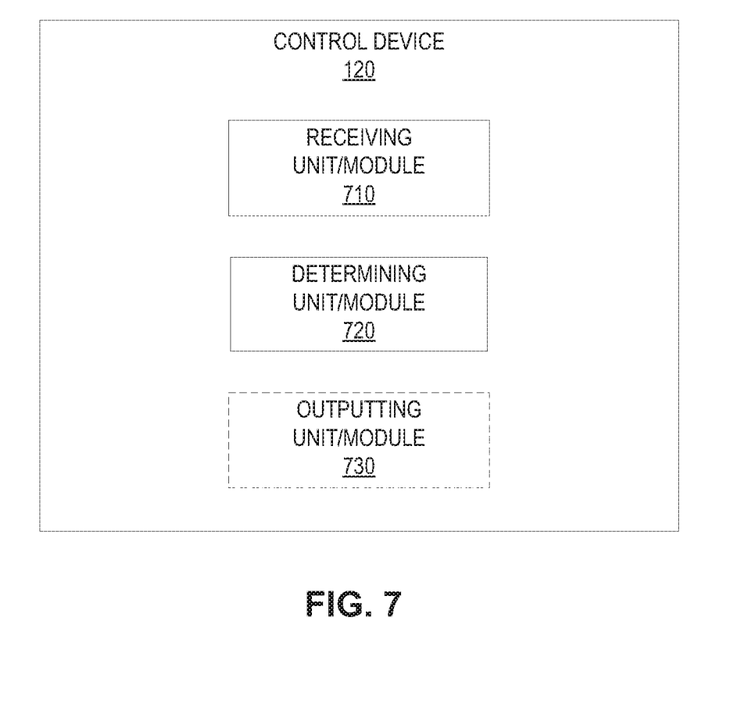
FIG. 7 is a block diagram illustrating another example control device, according to one or more aspects of the present disclosure.

Other embodiments of the present disclosure include the control device 120 implemented as a plurality of communicatively coupled physical units and/or software modules as illustrated in FIG. 7, e.g., in the processing circuitry 710. According to the example of FIG. 7, the control device 120 comprises a receiving unit or module 710 and a determining unit or module 720. The receiving unit or module 710 is configured to receive an image from an optical device. The determining unit or module 720 is configured to determine whether or not ice is present on a surface 160 based respectively on whether or not visible light induced by light projected by a UV light source 240 is captured in the image. In some aspects, the control device 120 further comprises an outputting unit or module 730 configured to signal an ice protection system communicatively coupled to the control device 120 to device the surface 160 responsive to the control device 120 detecting that the ice is present. In some aspects, the outputting unit or module 730 is additionally or alternatively configured to signal a display 140 to annunciate the icing condition to a human operator.

Those skilled in the art will appreciate that the circuits of various aspects may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

The present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A system for detecting ice on a surface, the system comprising:
   an ultraviolet (UV) light source configured to project light primarily in the UV-A spectrum onto the surface;
   an optical device configured to capture an image of the surface while the light primarily in the UV-A spectrum is projected by the UV light source;
   a control device communicatively coupled to the optical device, wherein the control device is configured to receive the image from the optical device and determine whether or not ice is present on the surface based respectively on whether or not visible light induced by the light projected by the UV light source is captured in the image by determining whether or not luminescence is captured in the image.

2. The system of claim 1, wherein the control device is further configured to signal an ice protection system communicatively coupled to the control device to device the surface responsive to the control device detecting that the ice is present.

3. The system of claim 1, wherein the UV light source and optical device are mounted on a fuselage of an aircraft and the surface is a surface of an airfoil.

4. The system of claim 3, wherein the surface is aft of the UV light source and optical device on the fuselage.

5. The system of claim 1, wherein to determine whether or not ice is present on the surface based respectively on whether or not visible light induced by the light projected by the UV light source is captured in the image, the control device is configured to compare the image to a baseline image of the surface in which ice is not present.

6. The system of claim 5, wherein to compare the image to the baseline image in which ice is not present on the surface, the control device is configured to compare color characteristics of the image to color characteristics of the baseline image.

7. The system of claim 1, wherein to determine whether or not ice is present on the surface based respectively on whether or not visible light induced by the light projected by the UV light source is captured in the image, the control device is configured to determine which of a plurality of stored images most closely resembles the image received from the optical device.

8. The system of claim 7, wherein the plurality of stored images comprises different images of the surface in which ice is present at different temperatures.

9. The system of claim 1, wherein the system further comprises an aircraft on which the UV light source and optical device are mounted, and which comprises the control device.

10. A system within an aircraft comprising:
    a UV-A light source configured to project light just in the UV-A spectrum onto a surface of the aircraft;
    an optical device configured to capture an image of the surface while the light in the UV-A spectrum is projected by the UV light source;
    a control device communicatively coupled to the optical device, wherein the control device is configured to receive the image from the optical device and determine whether or not ice is present on the surface based respectively on whether or not visible light induced by the light projected by the UV-A light source is captured in the image by detecting whether or not luminescence is captured in the image.

11. The system of claim 10, wherein the control device is further configured to signal an ice protection system communicatively coupled to the control device to device the surface responsive to the control device determining that the ice is present.

12. The system of claim 10, wherein to determine whether or not ice is present on the surface based respectively on whether or not visible light induced by the light projected by the UV-A light source is captured in the image, the control device is configured to compare the image to a baseline image of the surface in which ice is not present.

13. The system of claim 12, wherein to compare the image to the baseline image in which ice is not present on the surface, the control device is configured to compare color characteristics of the image to color characteristics of the baseline image.

14. The system of claim 10, wherein to determine whether or not ice is present on the surface based respectively on whether or not visible light induced by the light projected by the UV-A light source is captured in the image, the control device is configured to determine which of a plurality of stored images most closely resembles the image received from the optical device.

15. The system of claim 14, wherein the plurality of stored images comprises different images of the surface in which ice is present at different temperatures.

16. A method, implemented by an ice detection system, of detecting ice on a surface, the method comprising:
   receiving an image of the surface while a light, primarily in the ultraviolet (UV)-A spectrum, is projected onto the surface by a UV light source;
   determining whether or not ice is present on the surface based respectively on whether or not visible light induced by the light projected by the UV light source is captured in the image by detecting whether or not luminescence is captured in the image.

17. The method of claim 16, further comprising projecting, by the UV light source, the light primarily in the UV-A spectrum onto the surface.

18. The method of claim 16, wherein receiving the image comprises capturing, by an optical device of the ice detection system, the image of the surface while the light primarily in the UV-A spectrum is projected by the UV light source.

19. The method of claim 16, further comprising signaling an ice protection system to device the surface responsive to detecting that the ice is present.

20. The method of claim 16, wherein determining whether or not ice is present on the surface based respectively on whether or not visible light induced by the light projected by the UV light source is captured in the image comprises comparing the image to a baseline image of the surface in which ice is not present.

21. The method of claim 20, wherein comparing the image to the baseline image in which ice is not present on the surface comprises comparing color characteristics of the image to color characteristics of the baseline image.

22. The method of claim 16, wherein determining whether or not ice is present on the surface based respectively on whether or not visible light induced by the light projected by the UV light source is captured in the image comprises determining which of a plurality of stored images most closely resembles the image.

23. The method of claim 22, wherein the plurality of stored images comprises different images of the surface in which ice is present at different temperatures.

24. The system of claim 1, wherein the control device is further configured to distinguish between when the surface includes ice and when the surface is dry or wet.

25. The system of claim 1, wherein the UV light source further comprises a transparent surface that is heated.

26. The method of claim 1, wherein the light projected by the UV light source is within a range of 315 to 400 nanometers.

* * * * *